Feb. 1, 1938.  A. J. HENDERSON  2,107,182
VALVE
Filed Sept. 11, 1935

INVENTOR.
Albert J. Henderson

Patented Feb. 1, 1938

2,107,182

UNITED STATES PATENT OFFICE 2,107,182

VALVE

Albert J. Henderson, Hempfield Township, Westmoreland County, Pa., assignor to Walworth Patents Inc., Boston, Mass., a corporation of Massachusetts Application September 11, 1935, Serial No. 40,084

10 Claims. (Cl. 251—93)

This invention relates to valves and more particularly to lubricated valves. It is particularly adapted, although not limited, for services where high line pressures are encountered. Under such circumstances the valve member tends to move bodily or tilt in its seat toward the downstream side of the valve body when in closed position and thus bear more heavily on one side than on the other. In order to lubricate the valve in this condition the lubricant should be fed only to the seating surfaces on the downstream side of the valve, otherwise, the lubricant pressure will be dissipated and the lubricant wasted by its tendency to flow in the easiest path between the slightly separated seating surfaces on the upstream side and thence into the line.

It is an object of this invention to permit lubricant to flow only to the side of the valve which requires lubricating.

Another object of the invention is to relieve the operator of the responsibility of determining which side of the valve to lubricate.

Another object of the invention is to permit the lubricant to flow selectively to one side of the valve or the other, depending upon the direction of the flow of line fluid.

Another object of the invention is to render the selective distribution of the lubricant entirely automatic.

Another object of the invention is to permit the use of a single compressor for feeding the lubricant to either side of the valve.

Another object of the invention is to construct the lubricant device in a simple manner to permit economy in manufacture and reliability and simplicity in operation.

Other objects and advantages will become apparent from the following description taken in connection with the accompanying drawing wherein Fig. 1 is a front elevation of a lubricated plug valve embodying the invention and wherein the lubricating device is shown in longitudinal section taken on the line 1—1 of Fig. 2 looking in the direction indicated by the arrows.

In this exemplary embodiment the invention is applied to a lubricated plug valve. It will be apparent, however, that its application is not limited to valves of this type, wherein the plug member rotates in its seat, as other types of lubricated valves, such as gate valves could utilize the invention which thus has a wide field of application.

Figure 4:
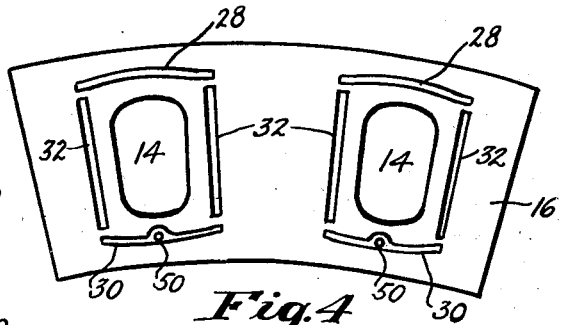
Fig. 3 is a section taken on the line 3—3 of Fig. 1 looking in the direction indicated by the arrows and Figs. 4 and 5 are developments of the seating surfaces of the body and plug members of the valve respectively showing the grooving system.
Figure 3:
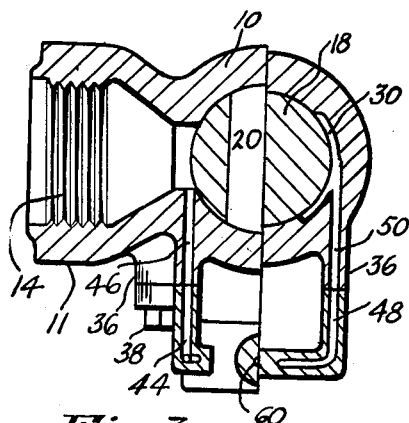
Figure 5:
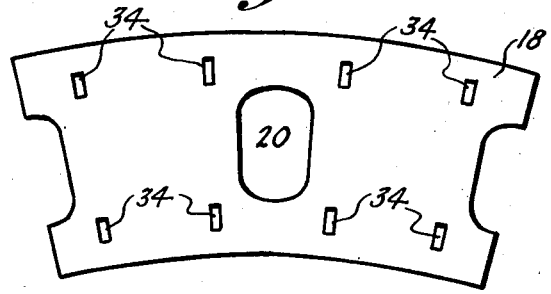

Referring more particularly to the drawing, the lubricated plug valve shown therein may comprise a body member 10 having hollow end portions 11 and 12 providing a pair of passageways for line fluid which may be threaded as at 14 (Fig. 3) to receive pipe connections. The fluid passages are intersected by a tapered valve seat 16 in which is seated a tapered plug member 18 having a port 20 therethrough which is adapted to register with the passageways in the body when the valve is in open position. The usual stem 22 may extend from the larger end of the plug member 18 through a cover member 24 and packing gland 26 and the projecting end of the stem 22 may be suitably squared for the reception of a wrench whereby the plug may be rotated in its seat.

The foregoing described structure is common to lubricated plug valves in general and further detailed description of the parts is deemed unnecessary.

This invention more specifically relates to the lubricating system of the valve, which in this instance, includes a pair of diametrically opposite transverse lubricant grooves 28 each of which is located in the valve seat 16 above one of the passageways and each extending through an angle of approximately ninety degrees. The seating surface 16 is further provided with a pair of diametrically opposite transverse lubricant grooves 30, each located below one of the fluid passageways and being otherwise similar to the lubricant grooves 28 which are positioned above. Furthermore, the valve seat 16 is provided with four longitudinal grooves 32 which are located on each side of the passageways and between the ends of the transverse grooves 28 and 30 but terminating short of connection with these transverse grooves.

The grooving system may be completed by the provision of eight dwarf grooves 34, four of which are located above the port 20 in the valve member 18 and the remaining four therebelow. These dwarf grooves 34 are arranged in such relation to the port 20 that they will overlie the ends of the transverse grooves 28 and 30 and the longitudinal grooves 32 when the valve is in full-open or full-closed position and thus form a complete and independent frame of sealing grooves around each of the passageways. In the arrangement described when the valve member 18 is rotated in the seat 16 from the full-open or full-closed position the dwarf grooves 34 therein are immediately disconnected from communication with the longitudinal grooves 32 and thus the complete framing of the passageways is no longer present. However, during this rotative movement of the plug, two diametrically opposite longitudinal grooves will be exposed to the fluid in the line as the port 20 passes across them and consequently, it has been arranged that these exposed grooves shall be cut off from the lubricant supply during this period. In order to render the valve rotatable in either clockwise or counter-clockwise direction without exposing any of the lubricant grooves to the fluid in the line, all of the longitudinal grooves 32 are arranged to terminate short of the transverse grooves and thus achieve this object.

The foregoing description of the grooving system for distributing the lubricant over the seating surface of the valve is merely of the form which is preferred for use in this embodiment. It will be understood that the arrangement of the lubricant grooves can be varied providing the grooves at one end of the body do not communicate in the closed position of the valve with those at the other end of the body. When the valve is in closed position and subject to high line pressure on one side of the plug member it is desirable for the reasons previously set forth to lubricate the valve only on the side which is opposite the pressure side and which may be termed the down-stream side as distinguished from the pressure or upstream side. Moreover, as the direction of the flow of the line fluid through the valve is often changed it is eminently desirable that the lubricant receiving side be changed accordingly. A feature of this invention is that this selective distribution of the lubricant is entirely automatic as will now become apparent.

A structure for accomplishing this purpose may comprise an inverted T-shaped fitting having a head portion 35 secured to a pair of pads 36 formed on the exterior of the body 10 intermediate the ends 11 and 12, as by means of the studs 38. The head portion 35 is suitably bored to form a blind ended valve chamber 40, the open end of which may be normally closed by a plug member 42. Communicating with the valve chamber 40 adjacent each end thereof is a pair of passageways 44 which in turn communicate with passageways 46 formed in the main valve body 10 and opening into the fluid passageways therein adjacent the valve seat 16. The head portion 35 is provided with an additional pair of passageways 48 which at one end communicate with the valve chamber 40 at the median portion thereof and being spaced one from the other. The opposite ends of the passageways 48 communicate with passageways 50 formed in the valve body and opening at their opposite ends into the lower transverse lubricant grooves 30 which are formed in the seating surface 16.

The passageways 48 are adapted to supply lubricant from the valve chamber 40 to the lower transverse grooves 30 by way of the passages 50 and, to this end, the leg 52 of the T-shaped fitting may be provided with a threaded lubricant reservoir 54 in which a compressor screw 56 may be reciprocated to force lubricant therefrom. A suitable check valve 58 may be positioned in the lower portion of the reservoir to prevent reflux f lubricant therefrom when the compressor screw 58 is removed. The reservoir 54 communicates with the valve chamber 40 by means of a port 60 which extends from the bottom of the reservoir into communication with the valve chamber 40 intermediate the passageways 48 but on the opposite side of the periphery. The area of the port 60 is preferably enlarged at its junction with the periphery of the valve chamber 40 by an elongated recess 62 of sufficient length to include the open ends of both passageways 48 within its boundary for a purpose to be described hereinafter.

The distribution of lubricant from the reservoir 54 to the passageways 48 is controlled by a spool valve element 64 which is shorter in length than the valve chamber in which it reciprocates but is adapted to extend from one end of the chamber and cover the open ends of both passageways 48. A circumferential recess 66 is formed in the spool valve element 64 intermediate its ends and is adapted to overlie the open end of one of the passageways 48 when the valve element is positioned at one end of the chamber, the open end of the other passageway 48 being covered at this time by the plain portion of the valve element.

Figure 1:
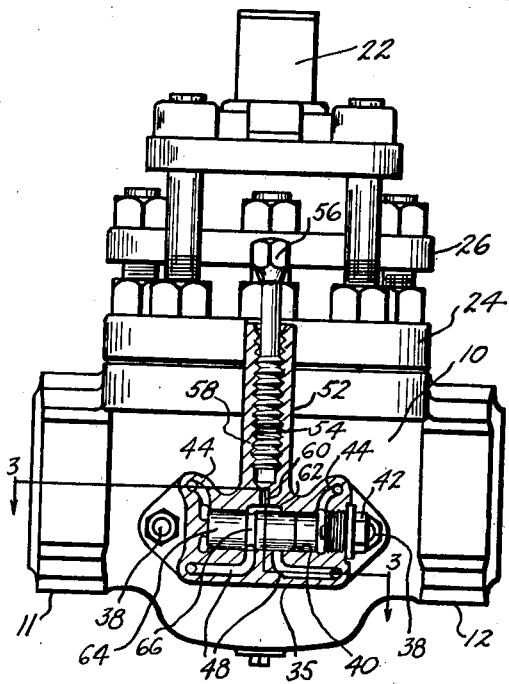
Figure 2:
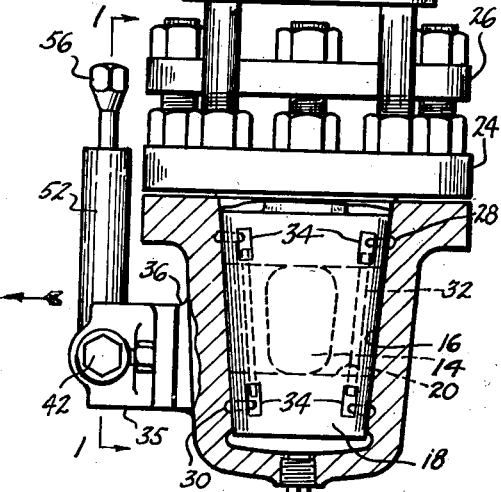
Fig. 2 is an end view of the valve with the body portion thereof shown partly in section.

The operation of the device is as follows: When the valve is assembled in a pipe line and closed against pressure, which in this instance, may be in the direction of the arrow in Fig. 1, the line fluid from the upstream side will enter the passageway 44 through the passageway 46 in the valve body 10 and thus reach the spool valve chamber 40. The spool valve 64 will thereupon assume the position shown in Fig. 1 with one end abutting the left-hand end of the valve chamber 40 and the circumferential recess 66 aligned with the open end of the adjacent passageway 48. This passageway 48 will therefore receive lubricant from the reservoir and will convey it through the connected passageway 50 in the valve body 10 to the lower transverse groove 30 whereupon it will be distributed to all of the grooves on the downstream side of the valve. As will be observed the spool valve 64 at this time closes off the end of the other passage 48 which opens into the valve chamber 40 and therefore no lubricant can reach the grooves at the upstream side of the valve. In view of the fact that there is no communication between the grooves at the downstream side of the valve with those on the upstream side, none of the lubricant in the downstream grooves can flow from that end of the valve to the other by way of the grooves and dissipate the lubricant pressure.

When the direction of the fluid flow is changed the line pressure will enter the passageway 44 on the opposite side and move the spool valve 64 to the opposite end of the valve chamber. The recess 66 in the spool valve 64 will then be aligned with the open end of the adjacent passage 48 which communicates with the grooves on the opposite end of the valve which now becomes the downstream side, it being noted that the circumferential recess 66 is always in communication with the reservoir 54 due to the provision of the elongated recess 62 at the end of the port 60. Thus, regardless of the direction of the flow of line fluid the part of the seating surfaces which requires lubrication will receive ample lubricant upon operation of the compressor screw as the movement of the valve 64 from one end of the chamber to the other is entirely automatic in response to the pressure of the line fluid. It will be apparent, therefore, that all the objects and advantages of the invention have been accomplished in a simple and economical manner.

I claim:

1. In combination, a lubricated valve comprising a body member having passageways for line fluid and a valve seat, a valve member adapted to engage said seat, a lubricant reservoir, and means responsive to the pressure of said line fluid for controlling the distribution of lubricant from said reservoir selectively to the seating surfaces adjacent any one of said passageways.

2. In combination, a lubricated valve comprising a body member having passageways for line fluid and a valve seat, a valve member adapted to engage said seat, a lubricant reservoir having connections with the seating surfaces adjacent each of said passageways, and means responsive to the pressure of said line fluid for admitting lubricant to one of said connections while preventing admittance to the other connection.

3. In combination, a lubricated valve comprising a body member having upstream and downstream passageways for line fluid and a valve seat intermediate said passageways, a valve member adapted to engage said seat, a lubricant reservoir having connections with the seating surfaces adjacent each of said passageways, and means responsive to the pressure of said line fluid for admitting lubricant to the connection with the seating surfaces adjacent the downstream passageway while preventing admittance to the connection with the seating surface adjacent the upstream passageway.

4. In combination, a lubricated valve comprising a body member having passageways for line fluid and a valve seat, a valve member adapted to engage said seat, a lubricant reservoir and a valve responsive to the pressure of said line fluid for admitting lubricant from said reservoir to the seating surfaces adjacent one of said passageways while preventing admittance to the seating surfaces adjacent another of said passageways.

5. In combination, a lubricated valve comprising a body member having passageways for line fluid and a valve seat, a valve member adapted to engage said seat, a lubricant reservoir having connections with the seating surfaces adjacent each of said passageways, and a valve movable by the pressure of said line fluid to a position for admitting lubricant to one of said connections while preventing admittance to the other connection.

6. In combination, a lubricated valve comprising a body member having passageways for line fluid and a valve seat intermediate said passageways, a valve member adapted to engage said seat, a lubricant reservoir having connections with the seating surfaces adjacent each of said passageways, and a valve movable by the pressure of said line fluid between the reservoir and the connections for admitting lubricant to one of said connections while preventing admittance to the other connection.

7. In combination, a lubricated valve comprising a body member having upstream and downstream passageways for line fluid and a valve seat intermediate said passageways, a valve member adapted to engage said seat, a lubricant reservoir, an auxiliary valve body associated with said reservoir, a valve chamber in said auxiliary body receiving lubricant from said reservoir and having connections with the seating surfaces adjacent each of the passageways, said chamber being adapted to receive line fluid from one of said passageways, and a valve element movable in the chamber by the pressure of said line fluid to a position for admitting lubricant to one of said connections while preventing admittance to the other connection.

8. In combination, a lubricated valve comprising a body member having upstream and downstream passageways for line fluid and a valve seat intermediate said passageways, a valve member adapted to engage said seat, a lubricant reservoir, means for forcing lubricant from said reservoir, an auxiliary valve body connected to said reservoir, a valve chamber in said auxiliary body having an inlet for lubricant from the reservoir intermediate the ends thereof and an outlet for said lubricant between the inlet and each of said ends, said outlets communicating with the seating surfaces adjacent the upstream and downstream passageways, said chamber having an opening at one end thereof communicating with the upstream passageway and an opening at the opposite end communicating with the downstream passageway, and a valve element movable in the chamber by the pressure of the line fluid from the upstream passageway and having a passage therein for lubricant to flow from the inlet to the outlet communicating with the seating surface adjacent the downstream passageway.

9. The combination with a lubricated valve having a body member provided with upstream and downstream passageways for line fluid and a valve seat, a valve member engaging said seat for controlling the flow of line fluid through said passageways, and an independent frame of lubricant grooves in the seating surfaces of said members around each of the upstream and downstream passageways, of means to supply lubricant to the frame of grooves around the downstream passageway only, said means comprising a T-shaped fitting secured to the exterior of the body intermediate said passageways, a valve chamber in one leg of said fitting having communication at one end thereof with said upstream passageway and communication at the opposite end with said downstream passageway, a lubricant reservoir in the other leg of said fitting communicating with said valve chamber intermediate the ends thereof, a pair of outlets leading from the valve chamber one to each frame of lubricant grooves, and a spool valve element reciprocable in the valve chamber in response to pressure of the line fluid from the upstream passageway, said valve element providing a passage for lubricant to the outlet leading to the grooves around the downstream passageway while providing a closure for the other said outlet.

10. In combination in a lubricated plug valve, a body member provided with fluid passageways and a valve seat, a valve member engaging said seat, lubricant grooves in the seating surfaces of said members around the fluid passageways, said grooves around one of said passageways being unconnected with those around another, an abutment integral with the casing projecting from one side thereof intermediate the fluid passageways and having a seating surface thereon, passages extending through said abutment and the casing and communicating with said grooves, passages extending through said abutment and the casing and communicating with said fluid passageways, a combined lubricant reservoir and valve chamber unit having a seating surface engaging the seating surface on said abutment and having passages communicating with the chamber and the passages in the casing, means to secure the said unit in position, a lubricant compressor for applying pressure to the lubricant in said reservoir, and a valve movable in said chamber in response to the pressure of line fluid in said second passages for controlling the distribution of lubricant through the first passages to the grooves around one or another of said fluid passageways.

ALBERT J. HENDERSON.